(12) United States Patent
Goldszmidt et al.

(10) Patent No.: US 9,160,752 B2
(45) Date of Patent: Oct. 13, 2015

(54) DATABASE AUTHORIZATION RULES AND COMPONENT LOGIC AUTHORIZATION RULES AGGREGATION

(75) Inventors: German S. Goldszmidt, Dobbs Ferry, NY (US); Dah-Haur H. Lin, Austin, TX (US); Anthony J. Nadalin, Austin, TX (US); Nataraj Nagaratnam, Morrisville, NC (US); Indrajit Poddar, Sewickley, PA (US)

(73) Assignee: International Business Machines Corporation, Armonk, NY (US)

( * ) Notice: Subject to any disclaimer, the term of this patent is extended or adjusted under 35 U.S.C. 154(b) by 1441 days.

(21) Appl. No.: 11/848,405

(22) Filed: Aug. 31, 2007

(65) Prior Publication Data

US 2009/0064272 A1   Mar. 5, 2009

(51) Int. Cl.
*H04L 29/06* (2006.01)
*G06F 21/62* (2013.01)

(52) U.S. Cl.
CPC .......... *H04L 63/105* (2013.01); *G06F 21/6227* (2013.01)

(58) Field of Classification Search
CPC ....... H04L 63/20; H04L 63/10; H04L 63/104; H04L 63/105; G06F 21/6218; G06F 21/604
USPC .................................. 726/1, 4; 707/786, 829
See application file for complete search history.

(56) References Cited

U.S. PATENT DOCUMENTS

| 7,089,584 | B1 | 8/2006 | Sharma |
| 2002/0188869 | A1 | 12/2002 | Patrick |
| 2003/0097574 | A1 | 5/2003 | Upton |
| 2003/0188040 | A1 | 10/2003 | Vincent |
| 2005/0027871 | A1 | 2/2005 | Bradley et al. |
| 2006/0206931 | A1 | 9/2006 | Dillaway et al. |
| 2006/0212593 | A1 | 9/2006 | Patrick et al. |
| 2008/0168530 | A1* | 7/2008 | Kuehr-McLaren et al. ...... 726/1 |

OTHER PUBLICATIONS

Ilechko, Paul, et al; Authorization Concepts and Solutions for J2EE Applications; http://www-128.ibm.com/developerworks/websphere/library/techarticles/0607_ilechko/0607_ilechko.html; Jul. 19, 2006.

Claub, Sebastian, et al; Identity Management and Its Support of Multilateral Security; Computer Networks 37 (2001) 205-219.

* cited by examiner

*Primary Examiner* — Eleni Shiferaw
*Assistant Examiner* — Paul Callahan
(74) *Attorney, Agent, or Firm* — Steven M. Greenberg, Esq.; CRGO Law

(57) ABSTRACT

Embodiments of the present invention provide a method, system and computer program product for aggregating database and component logic authorization rules in a multi-tier application. In an embodiment of the invention, a method for aggregating database and component logic authorization rules in a multi-tier application system can include aggregating role-based authorization rules for both a persistence layer and a logic layer of a multi-tier application in a unified policy, distributing the unified policy to both the persistence layer and the logic layer of the multi-tier application, transforming the unified policy into respectively a set of role based permissions for the persistence layer and a set of role based permissions for the logic layer, and applying the set of role based permissions for the persistence layer in the persistence layer, and the set of role based permissions for the logic layer in the logic layer of the multi-tier application.

11 Claims, 2 Drawing Sheets

DATABASE AUTHORIZATION RULES AND COMPONENT LOGIC AUTHORIZATION RULES AGGREGATION

BACKGROUND OF THE INVENTION

1. Field of the Invention

The present invention relates to the field of multi-tier application management and more particularly to authorizing access to multiple components of a multi-tier application.

2. Description of the Related Art

A multi-tier application is an application structurally distributed across a computer communications network. In a multi-tier application, the interface, data storage, the logical functionality of the application can be spread across one or more computing units and can be configured to interact with one another in concert to produce the effect of a unitary application. Different layers of a multi-tier application can communicate with one another, receiving input for processing and producing output to be provided to a different layer of the application.

Functional layers of a multi-tier application include a persistence layer in which application data is stored in a sensible, organized way, an accessor layer in which database access logic can be implemented to interact with the persistence layer, a logic layer processing user input and stored data to produce a useful result, and a presentation layer configured to present the useful result to an interacting end user. Additionally, a requestor/consumer layer can be provided through which an end user can interact with the application. Typically, a Web browser or heavy client acts as the requestor/consumer layer. Of note, security considerations must be applied at all layers of a multi-tier application.

In this regard, coordinating access control to different layers of a multi-tier application can be challenging as different technologies can structurally support different layers. For instance, user interface technologies such as dynamic markup language and script driven user interface engines require and support one set of languages and tools for specifying access control policies and different policy enforcement points for enforcing them. Intermediately, the logical components of the business logic and process orchestration layer of a multi-tier application support yet a different set of languages and tools for specifying access control policies and different policy enforcement points for enforcing them With respect to a database in the persistence layer, the structured query language (SQL) grant statement (SQL_GRANT) provides an exemplary mechanism for specifying authorization rules for database tables. SQL_GRANT statements generally are stored within special tables of an associated database. By comparison, with respect to component based logic in the logic layer, role-based access control is provided and stored in deployment descriptors for respective components. While the identity of an end user can flow from the logic layer to the persistence layer, the authorization rules for the same end user can vary due to different languages of specification and different storage locations. Additionally, due to the differences in the policy specification language and multiplicity of policy enforcement points, applications often choose to simplify specification and enforcement of access control policies only at one layer of the multi-tier application leaving other layers unprotected. Accordingly, inconsistencies can arise in the production and management of the authorization rules giving rise to security holes.

BRIEF SUMMARY OF THE INVENTION

Embodiments of the present invention address deficiencies of the art in respect to authorization rule management for a multi-tier application and provide a method, system and computer program product for aggregating database and component logic authorization rules in a multi-tier application. In an embodiment of the invention, a method for aggregating database and component logic authorization rules in a multi-tier application system can include aggregating role-based authorization rules for both a persistence layer and a logic layer of a multi-tier application in a unified policy, distributing the unified policy in the form of a canonical representation of policy expressions, to both the persistence layer and the logic layer of the multi-tier application, transforming the unified policy into respectively a set of permissions for the application components in the persistence layer and a set of role based permissions for the application components in the logic layer, and applying the set of permissions for the persistence layer to the policy decision point in the persistence layer, and the set of role based permissions for the logic layer to a policy decision point in the logic layer of the multi-tier application.

In one aspect of the embodiment, aggregating role-based authorization rules for both a persistence layer and a logic layer of a multi-tier application in a unified policy can include mapping permissions of an aggregation of authorization policies for both the persistence layer and the logic layer of the multi-tier application to a common role for both of the logic layer and the persistence layer. In another aspect of the embodiment, distributing the unified policy to both the persistence layer and the logic layer of the multi-tier application can include distributing the unified policy to both a database management system in the persistence layer and also a component container hosting component logic in the logic layer of the multi-tier application. Yet further, transforming the unified policy for each of the persistence layer and the logic layer into respectively a set of role based permissions for the persistence layer and a set of role based permissions for the logic layer can include transforming rules in the unified policy for the database management system into corresponding SQL grant or deny statements, and importing the rules into an authorization engine for the component container.

In another embodiment of the invention, a multi-tier application data processing system can be configured for aggregating database and component logic authorization rules. The system can include a multi-tier application including a persistence layer and a logic layer. The system also can include common aggregated authorization logic coupled to both the persistence layer and the logic layer. The logic can include program code enabled to aggregate role-based authorization rules for both the persistence layer and the logic layer in a unified policy, to distribute the unified policy to both the persistence layer and the logic layer for respective transformation and application in each of the persistence and logic layers. For example, the logic layer can include a container hosting a plurality of components in an application server and the persistence layer can include a database management system.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodi

DETAILED DESCRIPTION OF THE INVENTION

Embodiments of the present invention provide a method, system and computer program product for a multi-tier application system configured for aggregating database and component logic authorization rules. In an embodiment of the invention, permissions can be defined to encapsulate privileges required to protect a database table in the persistence layer of the multi-tier application. The defined permission can be aggregated with other permissions required for protecting logic components in the logic layer of the multi-tier application. The aggregated permissions can be mapped to a common role for both layers.

For example, the role-to-permission mapping can be specified in the extensible markup language (XML) using the extensible access control markup language syntax (XACML). The mapped aggregated permissions can be stored in a common data store accessible by both layers of the multi-tier application. Consequently, the mapped aggregated permissions can be translated into database authorization policy statements in the persistence layer and provisioned into the database containing the tables in the multi-tiered application. Likewise, the mapped aggregated permissions can be imported into an authorization engine for a container hosting the logic components of the logic layer of the multi-tier application which is capable of consuming XACML policies. Only those permissions in the aggregated set of permissions which are applicable to components residing in a particular layer can be applied to the particular layer.

Figure 1:
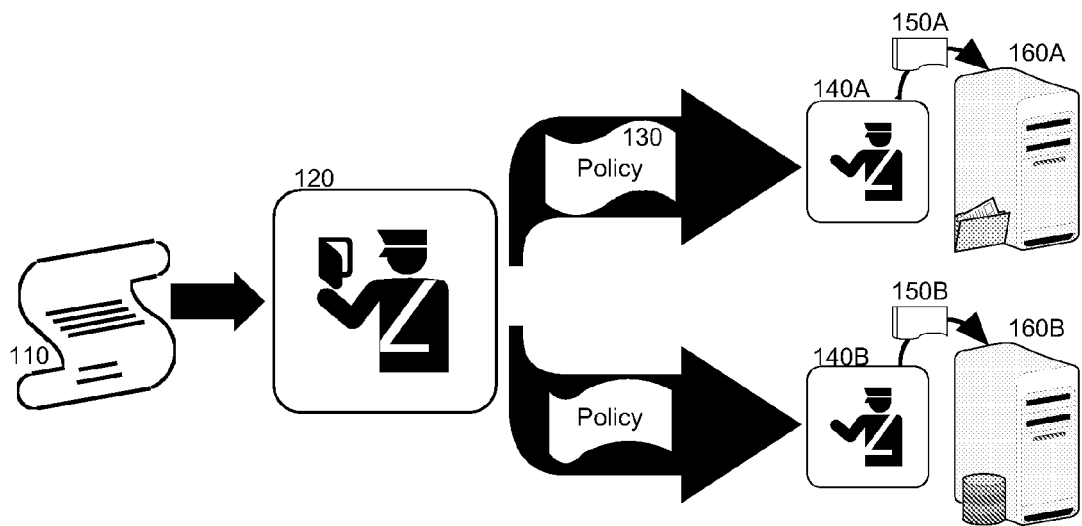
- FIG. 1 is a pictorial illustration of a multi-tier application system configured for aggregating database and component logic authorization rules.

In illustration, FIG. 1 is a pictorial illustration of a multi-tier application system configured for aggregating database and component logic authorization rules. As shown in FIG. 1, an aggregation 110 of authorization policies for both the persistence layer 160B and the logic layer 160A of a multi-tier application can be centrally managed by common aggregated authorization logic 120. The common aggregated authorization logic 120 can produce a unified authorization policy 130 mapping the permissions of the aggregation 110 to a common role for both of the logic layer 160A and the persistence layer 160B. The unified authorization policy 130 in turn can be distributed to a logic layer authorization engine 140A for the logic layer 160A of the multi-tier application, and a database access control 140B for the persistence layer 160B of the multi-tier application.

The logic layer authorization engine 140A can extract from the unified authorization policy 130 a set of rules 150A mapping the permissions to roles specified within the logic layer 160A. The rules 150A can be imported into the logic layer authorization engine 140A and activated for controlling access to logic components in the logic layer 160A. Similarly, database access control 140B can extract from the unified authorization policy 130 a set of rules 150B mapping the permissions to roles specified within the persistence layer 160B. The rules 150B can be translated into access control statements for the persistence layer 160B, for example SQL_GRANT statements. In this way, a consistent specification of access control rules can be provided for a common user identity, while allowing for a single point of storage and management of access control rules and further while providing single step provisioning of access control rules.

Figure 2:
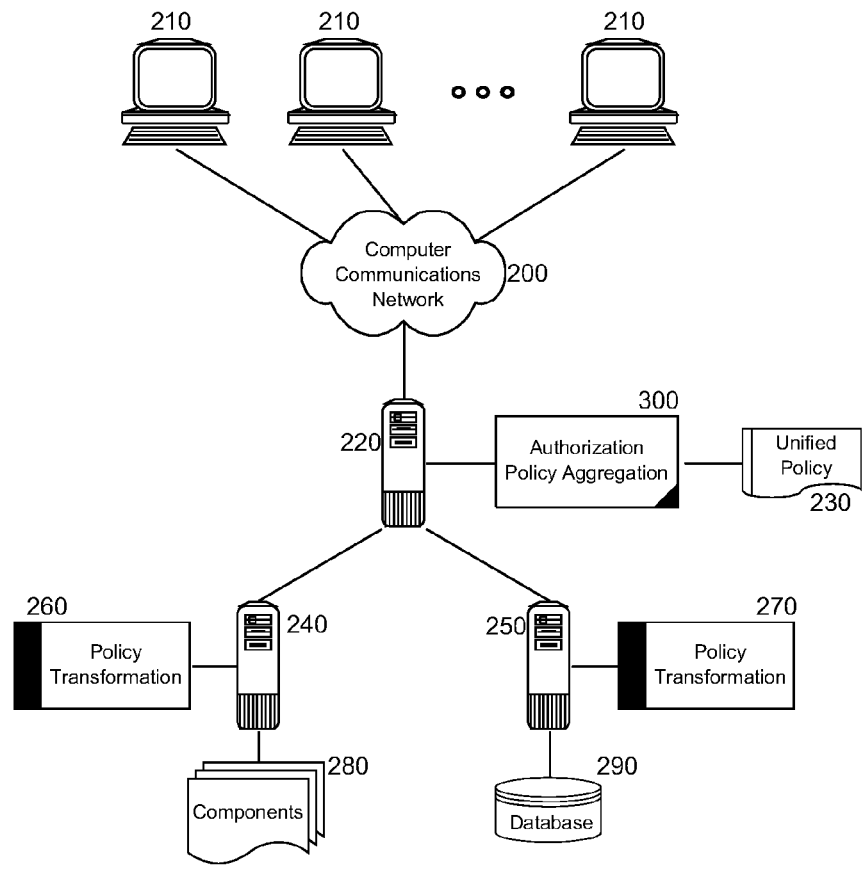
FIG. 2 is a schematic illustration of a multi-tier application system configured for aggregating database and component logic authorization rules; and, FIG. 3 is a flow chart illustrating a process for aggregating database and component logic authorization rules in a multi-tier application system.

The aggregation of access control rules for both the persistence layer of the multi-tier application and the logic layer of the multi-tier application can be supported in a multi-tier application data processing system. By way of illustrative example, FIG. 2 is a schematic illustration of a multi-tier application system configured for aggregating database and component logic authorization rules. As shown in FIG. 2, one or more clients 210 can be configured to access a multi-tier application over computer communications network 200. The multi-tier application can include both a component based application of components 280 operating in an application container supporting application server 240, and a database management system 250 supporting data access to data in database 290 on behalf of logic defined by components 280.

A common authorization policy manager 220 can host the execution of authorization policy aggregation logic 300. The authorization policy aggregation logic 300 can include program code enabled to aggregate role based access control rules for the components 280 of the application server 240 and database tables in the database 290. The program code further can be enabled to map the role based access control rules to a common role present in both the database 290 and the components 280, in order to produce a unified policy 230. The unified policy 230 in turn can be distributed to each of the application container hosting the execution of the components 280 in the application server 240 and the database management system 250 for the database 290.

As an example, the unified policy 230 can be expressed in pseudo XACML as follows:

```
<Policy RuleCombiningAlgId="rule-combining-algorithm " PolicyId=" aggregated-policy">
  <Rule RuleId="role-based-rule0" Effect="Permit">
    <Target>
      <Subjects>
        <Subject>
          <SubjectMatch MatchId="urn:co:function:role-match">
            <AttributeValue DataType="string"> Customer </AttributeValue>
            <SubjectAttributeDesignator AttributeId=DataType=java.security.Principal"/>
          </SubjectMatch>
        </Subject>
      </Subjects>
      <Resources> <AnyResource/></Resources>
      <Actions><AnyAction/></Action>
    </Target>
```

```
<Condition FunctionId=" java.security.Permission:match">
  <Apply FunctionId=" java.security.Permission:bag">
    <AttributeValue DataType=data-type:java.security.Permission"></AttributeValue>
    <AttributeValue DataType="WebResourcePermission"></AttributeValue>
    <AttributeValue DataType=string Name="Actions"> GET </AttributeValue>
    <AttributeValue DataType=string Name="Name"/>PersData</AttributeValue>
    <AttributeValue DataType=" java.security.Permission">
    <AttributeValue DataType="DBTablePermission"></AttributeValue>
    <AttributeValue DataType=" string" Name="Action"> select </AttributeValue>
    <AttributeValue DataType=" string" Name="TableName">PersDataTable</AttributeValue>
  </Apply>
  </Condition>
</Rule>
</Policy>
```

Policy transformation logic 260 can be coupled to the application container of the application server 240 and companion policy transformation logic 270 can be coupled to the database management system 250. The policy transformation logic 260 can include program code enabled to extract from the unified policy 230 mapped rules pertaining to access control for roles in the components 280. Likewise, the policy transformation logic 270 can include program code enabled to extract from the unified policy 230 mapped rules pertaining to access control for data in the database 290. In the latter circumstance, the program code of the policy transformation logic 270 can convert the extracted mapped rules to database access control statements like SQL_GRANT statements, for example GRANT SELECT ON ExampleDataTable TO GROUP CUSTOMER.

Figure 3:
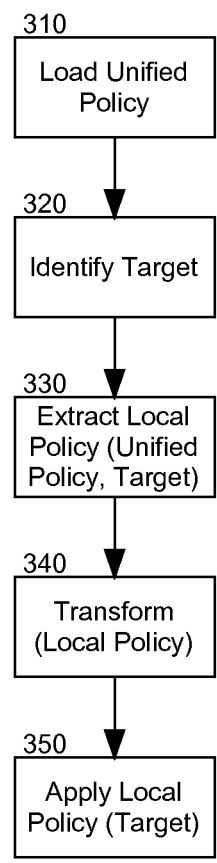

In yet further illustration of the operation of policy transformation logic 260, 270, FIG. 3 is a flow chart illustrating a process for aggregating database and component logic authorization rules in a multi-tier application system. Beginning in block 310, a unified policy can be loaded for processing and in block 320 a target can be identified for transforming the unified policy. In block 330, the local policy corresponding to the target can be located and extracted. Thereafter, in block 340 the extracted policy can be transformed into access control directives consistent with the target. Finally, in block 350, the transformed access control directives can be applied to the target.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for aggregating database and component logic authorization rules in a multi-tier application system, the method comprising:
    configuring a hardware processor to carry out the following:
        aggregating role-based authorization rules for both a persistence layer storing application data and also a logic layer processing both user input and also application data stored by way of the persistence layer in order to produce a result of a multi-tier application structurally distributed across a computer communications network in a unified policy;
        mapping permissions of an aggregation of authorization policies for both the persistence layer and the logic layer of the multi-tier application to a common role being present in both the persistence layer and the logic layer in the unified policy;
        distributing the unified policy to both the persistence layer and the logic layer of the multi-tier application;
        transforming the unified policy for each of the persistence layer and the logic layer into respectively a set of role based permissions for the persistence layer and a set of role based permissions for the logic layer; and,
        applying the set of role based permissions for the persistence layer in the persistence layer, and the set of role based permissions for the logic layer in the logic layer of the multi-tier application.

2. The method of claim 1, wherein distributing the unified policy to both the persistence layer and the logic layer of the multi-tier application, comprises distributing the unified policy to both a database management system in the persistence layer and also a component container hosting component logic in the logic layer of the multi-tier application.

3. The method of claim 2, wherein transforming the unified policy for each of the persistence layer and the logic layer into respectively a set of role based permissions for the persistence layer and a set of role based permissions for the logic layer, comprises:
  transforming rules in the unified policy for the database management system into corresponding structured query language (SQL) grant or deny statements; and,
  importing the rules into an authorization engine for the component container.

4. A multi-tier application data processing system configured for aggregating database and component logic authorization rules, the system comprising:
  a multi-tier application structurally distributed across a computer communications network comprising both a persistence layer storing application data and also a logic layer processing both user input and also application data stored by way of the persistence layer in order to produce a result;
  a processor executing common aggregated authorization logic on a computer and coupled to both the persistence layer and the logic layer, the common aggregated authorization logic comprising program code enabled to aggregate role-based authorization rules for both the persistence layer and the logic layer in a unified policy, to map permissions of an aggregation of authorization policies for both the persistence layer and the logic layer of the multi-tier application to a common role being present in both the persistence layer and the logic layer in the unified policy, to distribute the unified policy to both the persistence layer and the logic layer for respective transformation and application in each of the persistence and logic layers.

5. The system of claim 4, wherein the logic layer comprises a container hosting a plurality of components in an application server.

6. The system of claim 4, wherein the persistence layer comprises a database management system.

7. The system of claim 4, wherein the unified policy is expressed in a canonical policy expression format comprising an extensible access control markup language (XACML) document.

8. The system of claim 4, wherein the persistence layer comprises policy transformation logic comprising program code enabled to transform the role-based permissions into structured query language (SQL) grant or deny statements.

9. A computer program product comprising a non-transitory computer usable storage medium embodying computer usable program code for aggregating database and component logic authorization rules in a multi-tier application system, the computer program product comprising:
  computer usable program code for aggregating role-based authorization rules for both a persistence layer storing application data and also a logic layer processing both user input and also application data stored by way of the persistence layer in order to produce a result of a multi-tier application structurally distributed across a computer communications network in a unified policy;
  computer usable program code for mapping permissions of an aggregation of authorization policies for both the persistence layer and the logic layer of the multi-tier application to a common role being present in both the persistence layer and the logic layer in the unified policy;
  computer usable program code for distributing the unified policy to both the persistence layer and the logic layer of the multi-tier application;
  computer usable program code for transforming the unified policy for each of the persistence layer and the logic layer into respectively a set of role based permissions for the persistence layer and a set of role based permissions for the logic layer; and,
  computer usable program code for applying the set of role based permissions for the persistence layer in the persistence layer, and the set of role based permissions for the logic layer in the logic layer of the multi-tier application.

10. The computer program product of claim 9, wherein the computer usable program code for distributing the unified policy to both the persistence layer and the logic layer of the multi-tier application, comprises computer usable program code for distributing the unified policy to both a database management system in the persistence layer and also a component container hosting component logic in the logic layer of the multi-tier application.

11. The computer program product of claim 10, wherein the computer usable program code for transforming the unified policy for each of the persistence layer and the logic layer into respectively a set of role based permissions for the persistence layer and a set of role based permissions for the logic layer, comprises:
  computer usable program code for transforming rules in the unified policy for the database management system into corresponding structured query language (SQL) grant or deny statements; and,
  computer usable program code for importing the rules into an authorization engine for the component container.

* * * * *